(12) United States Patent
Shaver et al.

(10) Patent No.: US 8,767,882 B2
(45) Date of Patent: Jul. 1, 2014

(54) MOBILE WIRELESS COMMUNICATIONS DEVICE AND RECEIVER WITH DEMODULATION AND RELATED METHODS

(75) Inventors: Joseph B. Shaver, Rochester, NY (US); John Wesley Nieto, Rochester, NY (US); William N. Furman, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 463 days.

(21) Appl. No.: 12/884,846

(22) Filed: Sep. 17, 2010

(65) Prior Publication Data

US 2012/0069936 A1 Mar. 22, 2012

(51) Int. Cl.
*H04L 27/06* (2006.01)
(52) U.S. Cl.
USPC ............................. 375/340; 375/298; 375/341
(58) Field of Classification Search
USPC .................................. 375/233, 298, 341, 348
See application file for complete search history.

(56) References Cited

U.S. PATENT DOCUMENTS

| | | | | |
|---|---|---|---|---|
| 5,513,215 A * | 4/1996 | Marchetto et al. | ............. | 375/233 |
| 6,023,783 A | 2/2000 | Divsalar et al. | ................. | 714/792 |
| 6,637,006 B1 * | 10/2003 | Burton | ............................ | 714/798 |
| 6,658,071 B1 * | 12/2003 | Cheng | ............................ | 375/348 |
| 6,968,021 B1 | 11/2005 | White et al. | | |
| 7,092,457 B1 | 8/2006 | Chugg et al. | ................... | 375/324 |
| 7,096,412 B2 | 8/2006 | Chen et al. | ...................... | 714/794 |
| 7,548,598 B2 | 6/2009 | Nieto | ............................ | 375/350 |
| 7,603,612 B2 | 10/2009 | Nieto | ............................ | 714/794 |
| 7,620,881 B2 | 11/2009 | Nieto | ............................ | 714/794 |
| 7,631,243 B2 | 12/2009 | Nieto | ............................ | 714/755 |
| 7,657,825 B2 | 2/2010 | Norris et al. | ................... | 714/792 |
| 2008/0165890 A1 * | 7/2008 | Doberstein et al. | ............ | 375/298 |
| 2010/0284480 A1 * | 11/2010 | Jia et al. | ......................... | 375/260 |

FOREIGN PATENT DOCUMENTS

| | | |
|---|---|---|
| EP | 1246418 | 10/2002 |
| WO | 0161952 | 8/2001 |

OTHER PUBLICATIONS

Duel-Hallen, A.; Heegard, C., "Delayed Decision-Feedback Sequence Estimation," Communications, IEEE Transactions on, vol. 37, No. 5, pp. 428-436, May 1989.
Viswanathan, H.; Li, X.; Krishnamoorthy, R., "Adaptive Coded Modulation over Slow Frequency-Selective Fading Channels," Bell Labs, Lucent Technologies, IEEE, pp. 2388-2392, 1999.
Li et al., "A robust noncoherent iterative detection algorithm for serially concatenated CPM", Turbo Codes and Iterative Information Processing, IEEE, Sep. 2010, pp. 334-338.

* cited by examiner

*Primary Examiner* — Leon-Viet Nguyen
(74) *Attorney, Agent, or Firm* — Allen, Dyer, Doppelt, Milbrath & Gilchrist, P.A.

(57) ABSTRACT

A mobile wireless communications device may include an antenna, and a receiver coupled to the antenna and being configured to use a modulation having memory for a received message in a block structure. The block structure may include a pair of mini-probes and a body therebetween. The receiver may be configured to demodulate the received message by determining a corresponding set of received signal characteristic values based upon the pair of mini-probes, and determining a decode starting point in the body based upon the set of received signal characteristic values. The receiver may be configured to demodulate the received message by at least, from the decode starting point, decoding the body in a first time direction, and decoding the body in a second time direction based upon a result of the decoding in the first direction.

31 Claims, 4 Drawing Sheets

US 8,767,882 B2

MOBILE WIRELESS COMMUNICATIONS DEVICE AND RECEIVER WITH DEMODULATION AND RELATED METHODS

FIELD OF THE INVENTION

The present invention relates to the field of mobile wireless communications devices, and, more particularly, to mobile wireless communications devices using modulations having memory and related methods.

BACKGROUND OF THE INVENTION

Mobile communications devices have become an integral part of society over the last two decades. Indeed, more than eighty-two percent of Americans own a mobile communications device, for example, a cell phone. The typical mobile communications device includes an antenna, and a transceiver coupled to the antenna. The transceiver and the antenna cooperate to transmit and receive communications signals.

Before transmission, the typical mobile communications device modulates digital data onto an analog signal. As will be readily appreciated by the skilled person, there is a plurality of modulations available for most applications. Some particularly advantageous modulations include, for example, continuous phase modulation (CPM). The constant envelope characteristics of this modulation provide for lower energy demands on the power amplifier of mobile communications devices, for example, by reducing the peak-to-average power ratio (PAPR), increasing average transmit power (providing greater transmission range), and increasing amplifier efficiency, i.e. allowing the use of non-linear amplifiers such as Class C amplifiers. Moreover, CPM provides for efficient use of available bandwidth.

A potential drawback of CPM modulations, for example, Gaussian Minimum-shift keying (GMSK), is the use of the inherent memory of the modulation when demodulating/decoding the waveform in order to obtain good demodulator performance. When the mobile communications device receives a transmitted signal which uses a modulation with memory, the decoder uses not only the current signal portion to demodulate but in addition uses information from previous signal portions, i.e. memory, to demodulate the current signal. In other words, the phase of the transmitted signal is dependent on previous signaling intervals. Decoding modulations with memory increases the computational and memory demands on the transceiver, i.e. a maximum likelihood sequence estimator (MLSE) is typically used to demodulate modulations with memory, thereby increasing the complexity of the device, which may be undesirable in a limited power compact mobile device. More so, when the received signal has a multipath component to it, the size of the MLSE trellis structure used to demodulate the signal grows exponentially, which may make practical implementation in a mobile communications device difficult.

Digital communications theory has undergone a significant transformation in the last two decades due mainly to the discovery of iterative codes. Serially concatenated iterative codes are composed of two forward error correction (FEC) codes that are separated by a random interleaver. The outer code can be recursive or non-recursive in nature, but the inner code must be recursive in order for there to be interleaver gains when soft information is exchanged between the two codes. An approach investigated by several researchers was the possibility of using CPM waveforms as rate 1 recursive inner codes and combining them with simple convolutional FEC outer codes. Researchers showed that this approach could achieve close to Shannon performance.

When serially concatenated codes, which use CPM waveforms as the inner code, are used on multipath fading channels, the complexity of the inner MLSE soft-input soft-output (SISO) algorithms can be quite high, especially when the decoder must iterate several times between the inner CPM/Multipath SISO and the outer FEC SISO. This is due to the fact that CPM waveforms may require a MLSE for proper demodulation of the waveform, and the additional requirement of handling multipath further may increase the size of the MLSE in an exponential manner.

Most SISO algorithms, for example, the BCJR algorithm, may require forward and backward recursions on the trellis the algorithms operate on, i.e. inner CPM/Multipath trellis or outer FEC trellis, before computing the extrinsic information which will be provided to the other SISO device, for example, inner SISO device generates extrinsic information for outer SISO device. Both forward and backward recursions require the computation of independent path metrics for each direction. In an effort to reduce the trellis structure of SISO decoders, some approaches include reducing the number of states in the trellis, i.e. reduced state trellis. For example, U.S. Pat. No. 7,096,412 to Chen et al. discloses a reduced complexity iterative decoding method. Nevertheless, the forward/backward SISO computation of the reduced states and survivor paths can still represent a serious computational workload for the receiver device, especially in mobile applications.

SUMMARY OF THE INVENTION

In view of the foregoing background, it is therefore an object of the present invention to provide a mobile wireless communications device that demodulates efficiently and without consuming significant computational resources.

This and other objects, features, and advantages in accordance with the present invention are provided by a mobile wireless communications device that comprises an antenna, and a receiver coupled to the antenna and being configured to use a modulation having memory, such as continuous phase modulation (CPM), for example, for a received message in a block structure. The block structure may include a pair of mini-probes and a body therebetween. In some embodiments, the receiver may be configured to use the modulation with the block structure further comprising at least three mini-probes and a plurality of bodies therebetween. The receiver may be configured to demodulate the received message by at least determining a corresponding set of received signal characteristic values, such as a channel estimate, based upon the pair of mini-probes, determining a decode starting point in the body based upon the set of received signal characteristic values, i.e. determining the direction of the decoder (normal time or time-reversed), from the decode starting point, decoding the body in a first time direction, and decoding the body in a second time direction based upon at least one result of the decoding in the first direction. Advantageously, the mobile receiver may demodulate the received message with reduced computational load.

In particular, the receiver may be configured to determine survivor branch metrics from the decoding in the first time direction and to use the first direction survivor branch metrics in the decoding in the second direction. Further, the determining of the decode starting point may comprise determining for each mini-probe the received signal characteristic value for a respective end portion of the body, and selectively time reversing the body to provide the decode starting point at the end having a desired value, i.e. a minimum phase value for the received signal characteristic.

For example, the set of received signal characteristic values may comprise a received signal channel estimate value. In some embodiments, the receiver may determine a channel estimate across the body based upon interpolating respective channel estimates from the mini-probes.

In other embodiments, the receiver may be configured to decode based upon a reduced trellis structure. Also, the at least one result may comprise at least one survivor branch metric, for example. Further, the receiver may be configured to use at least one of a BCJR algorithm, a Max-Log-MAP algorithm, a Constant-Log-MAP algorithm, a Linear-Log-MAP algorithm or other variations to the Log-MAP algorithm.

Another aspect is directed to a wireless receiver comprising a memory unit, and a processor coupled to the memory unit and being configured to use a modulation having memory for a received message in a block structure. The block structure includes a pair of mini-probes and a body therebetween. The processor is configured to demodulate the received message by at least determining a corresponding set of received signal characteristic values based upon the pair of mini-probes, and determining the decode starting point in the body based upon the set of received signal characteristic values. The processor is configured to demodulate the received message by at least from the decode starting point, decoding the body in a first time direction and determining survivor branch metrics therefrom, and decoding the body in a second time direction based upon at least the survivor branch metrics of the decoding in the first direction. The decoding in the first and second time directions may be based upon a reduced trellis structure.

Another aspect is directed to a method of receiving a message in a block structure and with a modulation having memory, the block structure including a pair of mini-probes and a body therebetween. The method may include using a processor to determine a corresponding set of received signal characteristic values based upon the pair of mini-probes, and using the processor to determine a decode starting point in the body based upon the set of received signal characteristic values. The method may include from the decode starting point, using the processor to decode the body in a first time direction, and using the processor to decode the body in a second time direction based upon at least one result of the decoding in the first direction.

DETAILED DESCRIPTION OF THE PREFERRED EMBODIMENTS

The present invention will now be described more fully hereinafter with reference to the accompanying drawings, in which preferred embodiments of the invention are shown.

This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
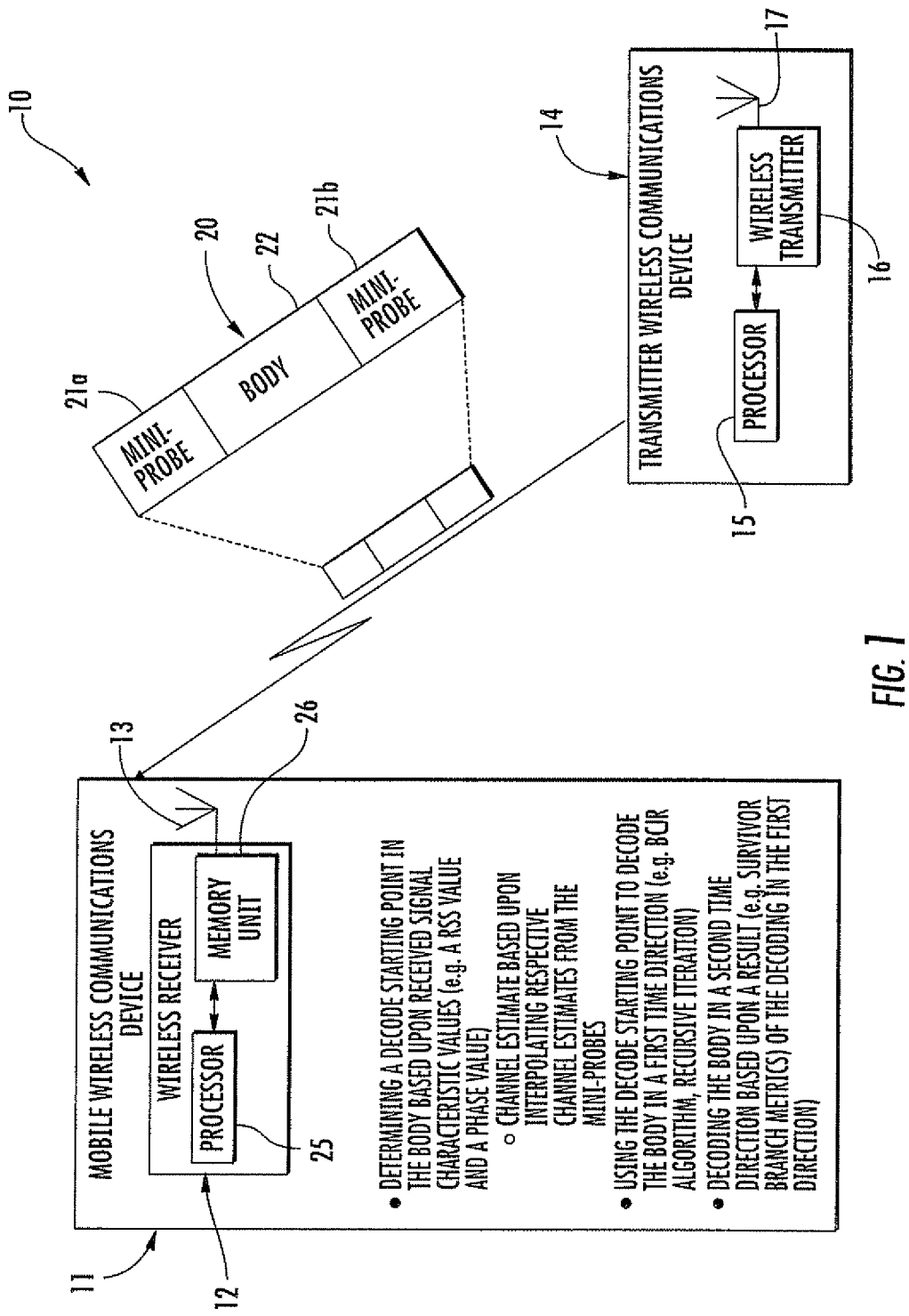
FIG. 1 is a schematic block diagram of a wireless communication system, according to the present invention.
Figure 2:
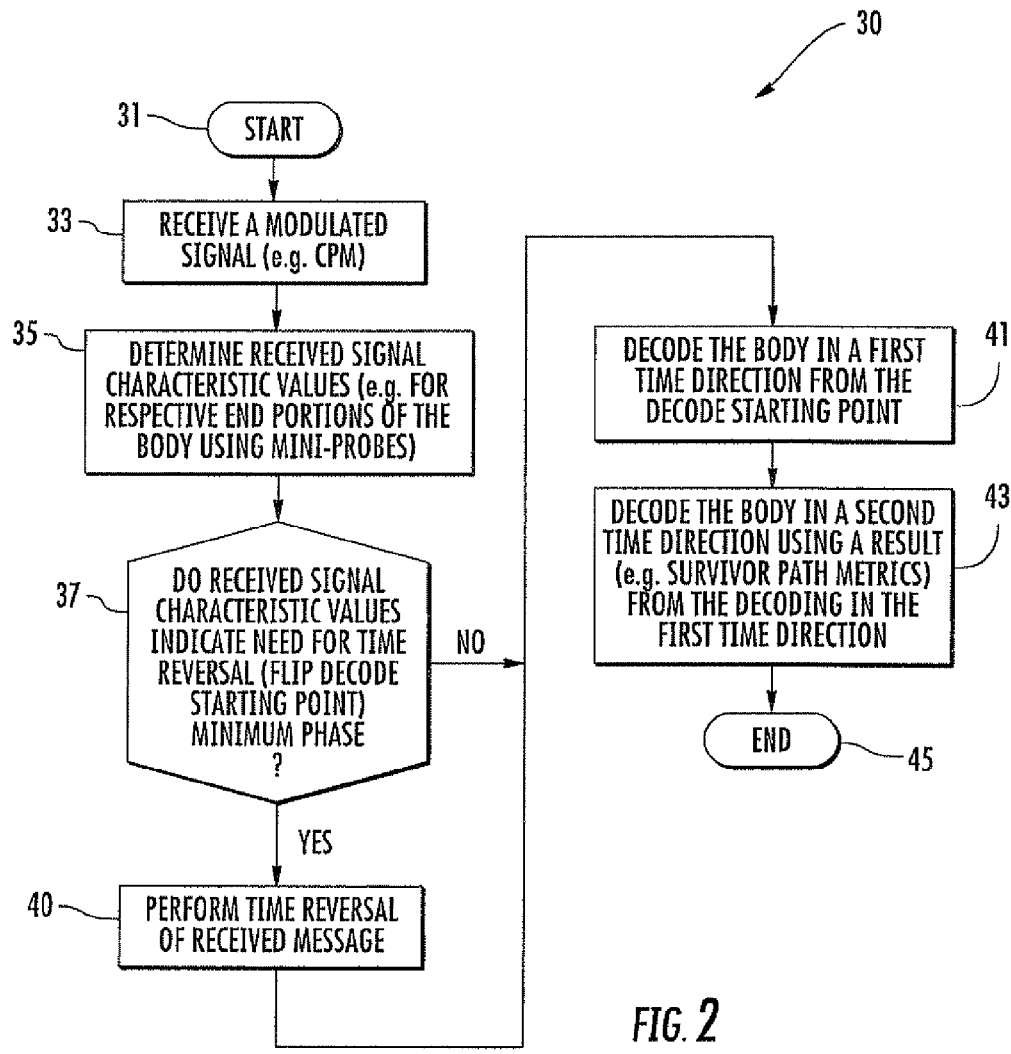
FIG. 2 is a flowchart illustrating operation of the receiver wireless communications device of FIG. 1.

Referring initially to FIGS. 1-2, a wireless communication system 10 according to the present invention is now described. The wireless communications system 10 illustratively includes a receiver wireless communications device 11, and a transmitter wireless communications device 14 communicating therewith. Furthermore, a flowchart 30 illustrates a method of operation of the receiver wireless communications device 11, which begins at Block 31. The receiver wireless communications device 11 illustratively includes an antenna 13, and a wireless receiver 12 coupled to the antenna. The transmitter wireless communications device 14 illustratively includes an antenna 17, a transmitter 16 coupled to the antenna, and a processor 15 coupled to the transmitter. As will be appreciated by those skilled in the art, the wireless communications devices 11, 14 may include a plurality of differing types of wireless communications devices modified according to the teachings herein, for example, the Falcon® III/117G manpack radio, or SBR/SPR handheld radio, as available from the Harris Corporation of Melbourne, Fla., the assignee of the present application.

As illustrated, the receiver 12 comprises a processor 25, and a memory unit 26 coupled thereto. In some embodiments, the processor 25 and the memory unit 26 may be implemented in a field-programmable gate array (FPGA). The wireless communication system 10 may use a communication protocol. For example, the communication protocol may be based upon time division multiple access (TDMA) and be adapted for burst slotted TDMA communications.

As illustrated, the transmitter wireless communications device 14 transmits a modulated signal to the receiver wireless communications device 11. In one particularly advantageous embodiment, the wireless communication system 10 uses an outer forward error correction (FEC) code concatenated with an inner continuous phase modulation (CPM) waveform in a burst TDMA scheme. In particular, and as will be appreciated by those skilled in the art, the inner decode trellis used by the receiver 12 has its number of states reduced (reduced state trellis). In other embodiments, a full state trellis can be used. In another embodiment, the receiver 12 may implement the trellis decoder disclosed in U.S. Pat. No. 7,657,825 to Norris et al., also assigned to the present application's assignee and incorporated herein by reference in its entirety. If multipath is present, a decision directed survivor path will be used to keep track of the additional multipath components without incurring a growth in the size of the original CPM trellis.

In the receiver wireless communications device 11, trellis complexity is reduced by keeping the full state CPM trellis (i.e. CPM trellis for channels without multipath) and using forward survivor symbols to account for the multipath channel. In other embodiments, the receiver 12 may be configured to use another modulation having memory.

Figure 4:
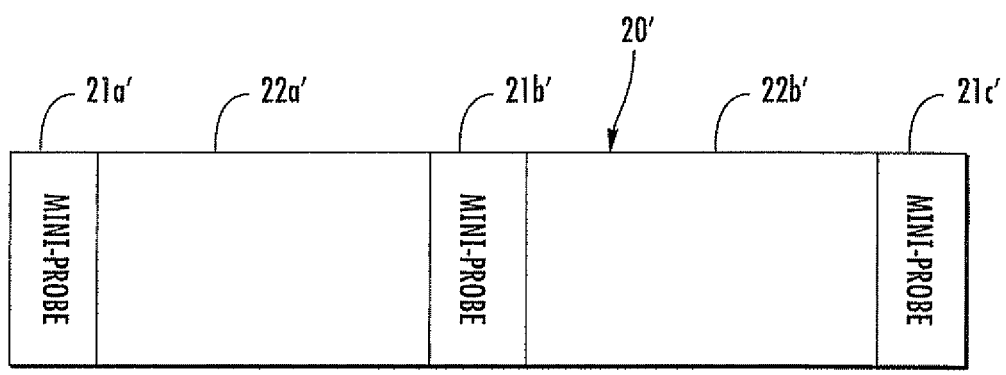
FIG. 4 is a schematic block diagram of another embodiment of the block structure, according to the present invention.

As illustrated, the received message 20 has a block (frame) structure (Block 33). The block structure may include a pair of mini-probes 21a-21b and a body 22 therebetween. In other embodiments, the block structure may include a plurality of mini-probes, for example, three, and bodies, for example, two, therebetween (FIG. 4). Also, although the message 20 is illustrated as a single frame, the message could comprise a plurality of frames, each having a body 22 between a pair of mini-probes 21a-21b.

As will be appreciated by those skilled in the art, each of the mini-probes 21a-21b has known symbol values for providing a channel estimate for the body 22 and the inner trellis decoding process. Indeed, the known data symbols are made available to all wireless communications devices 11, 14 in the wireless communication system 10 a priori receipt of the received message. In some embodiments, the channel estimate may be modified by re-modulating extrinsic information from the outer decoder and using an adaptive estimator, such as a least mean squares (LMS) process or a recursive least squares (RLS). The inner decoding process starts with the mini-probe 21a-21b so that when the body portion 22 is reached, the state metrics are very reliable. Accordingly, although it is not used to generate extrinsic information to pass to outer decoder it is very important for good performance of inner decoder.

The receiver 12 is illustratively configured to demodulate the received message 20 by at least determining a corresponding set of received signal characteristic values based upon the pair (or all three mini-probes in embodiments including more than a pair of mini-probes) of mini-probes 21a-21b (Block 35). The receiver 12 is configured to determine whether the channel estimate is minimum-phase or non minimum-phase and select the decoder direction based on which direction the channel estimate appears as minimum phase (i.e. the largest channel estimate tap is on the left hand side). For example, the set of received signal characteristic values may comprise a received signal strength value and a received channel estimate value. In some embodiments, the receiver 12 may determine a channel estimate across the body based upon interpolating respective channel estimates from the mini-probes. For example, the interpolation operation may use at least one of a linear interpolation, a Wiener filter interpolation, or other interpolation techniques which can be constrained by a maximum expected Doppler spread tolerance. In other less complex embodiments, the receiver 12 may be configured to perform an average between the channel estimates provided by the pair (or all three mini-probes in embodiments including more than a pair of mini-probes) of mini-probes 21a-21b.

The receiver 12 determines which end of the received frame 20 provides a minimum phase channel to allow for re-use of base processing architecture, i.e. it enables all algorithms to stay the same. Of course, the inner decoder needs to correct for time-reversal before sending extrinsic information to outer decoder. The time reversal transforms a non-minimum phase channel to a minimum phase channel.

The receiver 12 is illustratively configured to determine a decode starting point in the body 22 based upon the set of received signal characteristic values. More specifically, the receiver 12 is configured to determine for each mini-probe 21a-21b the received signal characteristic value for a respective end portion of the body 22. The receiver 12 is checking the received frame's channel estimate to determine if the channel estimate is minimum phase from left to right or from right to left. A minimum phase channel allows for proper decoding of a CPM waveform when multipath component is not included in the trellis (i.e. reduced trellis relative to size of trellis required to account for multipath). Depending on the channel estimate provided for the body 22, the receiver 12 is configured to selectively time reverse the body and mini-probes to provide the decode starting point at the end having the desired value for the received signal characteristic value (Decision Block 37 and Block 40). As will be appreciated by those skilled in the art, the decode direction is always right to left, but the time reversal provides the proper direction.

The receiver 12 is illustratively configured to begin at the decode starting point and decode the mini-probe and body 22 in a first time direction, i.e. the receiver performs a reduced state forward recursion using at least one of the following algorithms: a BCJR algorithm, a Log-MAP algorithm, a Max-Log-MAP algorithm, a Constant-Log-MAP algorithm, a Linear-Log-MAP algorithm or any other variations to the Log-MAP algorithm (Block 41). During this first decoding, the receiver 12 determines survivor path metrics for the reduced state decoding trellis.

Thereafter, the receiver 12 is illustratively configured to decode the body 22 in a second time direction based upon at least one result of the decoding in the first direction, i.e. the receiver performs a reduced state backward recursion (Blocks 43 & 45). In particular, the receiver 12 uses the survivor path metrics generated from the first time direction decoding in the second time direction decoding, i.e. re-use metrics computed from first direction and generate extrinsic information for the outer FEC decoder based on the combined results. In some embodiments, the receiver 12 may be configured to perform inner and outer decoding operation multiple times. In some embodiments, the receiver 12 may use only the survivor path metrics generated from the first time direction decoding for both forward and backward recursions.

In other words, the processor 25 may be configured to demodulate the received message 20 by decoding the inner CPM trellis in the first direction and then using the survivor branch metrics from the first direction in the second direction, exchanging extrinsic information with outer FEC decoder and repeating process in an iterative fashion. In other words, metrics are only computed during forward direction decode, and the backward direction decode uses metrics from the forward direction.

The inner CPM trellis decoding in the first and second directions may be based upon a reduced CPM and/or Multipath trellis structure. Depending on the application, the design of the block structure of the wireless communication system 10 balances the trade-off of performing N iterations (inner and outer decode exchanges) with a channel estimate of length X samples versus reducing number of iterations but increasing the channel estimate length. For example, 4 iterations with channel estimate of length 9 versus 2 iterations with a channel estimate of length 17.

Moreover, the receiver 12 is illustratively configured to combine the forward and backward metrics to produce soft decision outputs for the outer soft-input soft-output (SISO) decoder. In some embodiments, the receiver 12 may threshold survivor state metrics, i.e. if a state metric is below or above a threshold, the state is skipped and the next state is processed. The state metric threshold is based upon a largest or smallest state metric for a given time index in the trellis. Advantageously, this reduces the computational load for the receiver 12, which, in the typical mobile device, increases battery life and reduces design complexity. Also, the decoding process of the receiver 12 takes less time to compute.

On subsequent passes, the receiver 12 may reevaluate whether to use time reversal also based upon extrinsic information from the outer decoder. In some embodiments, the extrinsic information passed from the outer decoder to the inner decoder may be scaled by a factor less than 1.0, thereby improving iterative convergence.

Figure 3:
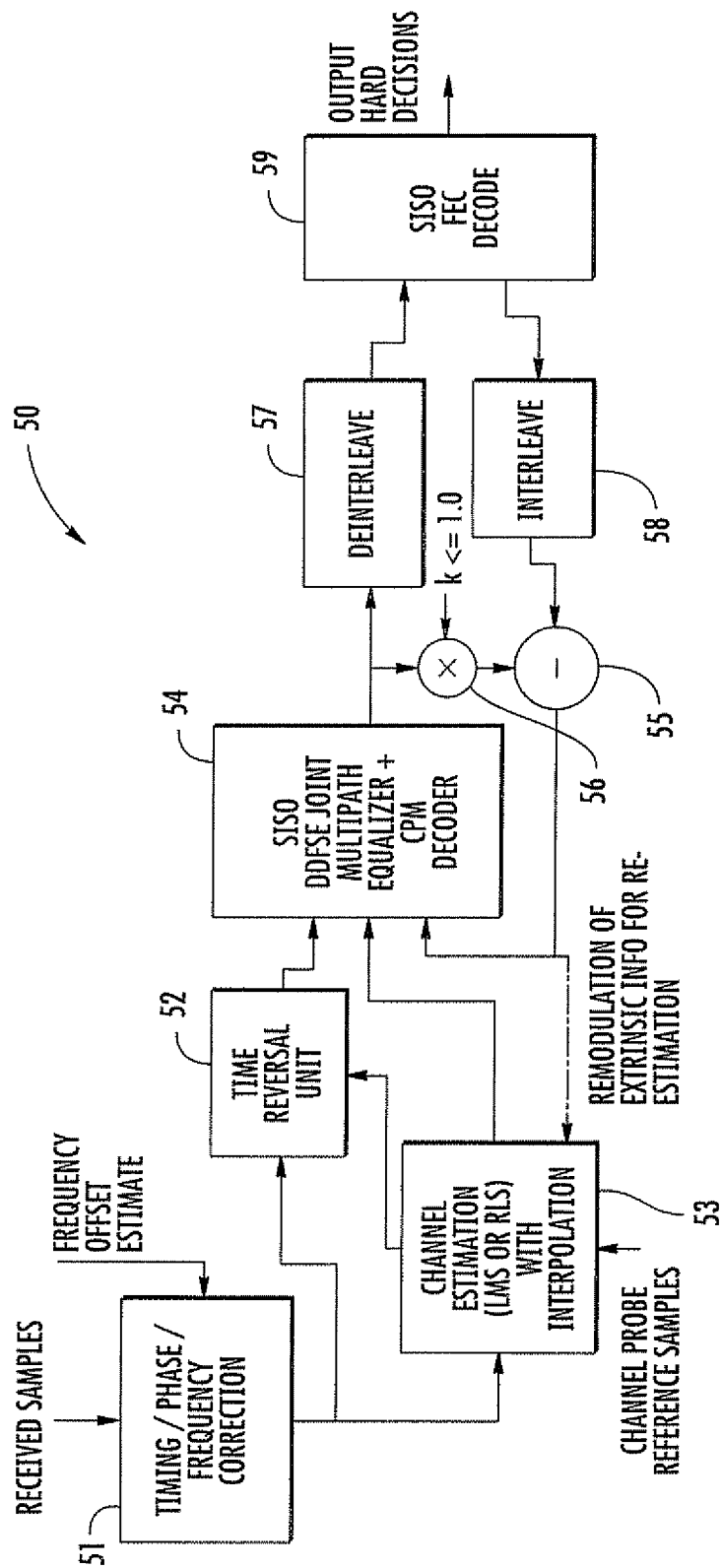
FIG. 3 is a schematic block diagram of another embodiment of the receiver wireless communications device, according to the present invention.

Referring to FIG. 3, as will be appreciated by those skilled in the art, an exemplary implementation 50 of the aforementioned receiver wireless communications device 11 is illustrated. This device 50 illustratively includes a time/phase/ frequency correction module 51 receiving samples from a received signal and a frequency offset estimate. The device 50 illustratively includes a channel estimate module 53 coupled downstream from the correction module 51, and a time reversal module 52 coupled to the outputs from the correction module and the channel estimate module. As discussed above, the operation of the time reversal module 52 is based upon the channel estimate from the mini-probes. The device 50 illustratively includes a SISO decoder module 54 using Delayed Decision Feedback Sequence Estimation (DDFSE) coupled to the outputs of the time reversal module 52 and the channel estimate module 53. The device 50 illustratively includes a multiplier 56 and a subtractor 55 providing a feedback path for the decoder module 54. The device 50 illustratively includes a deinterleave module 57 coupled downstream from the decoder module 54, a SISO FEC decoder module 59 coupled to the output thereof, and a interleave module 58 coupled between the SISO FEC decoder and the subtractor 55.

Referring now to FIG. 4, another embodiment of the block structure of the received message 20 is now described. In this embodiment of the block structure, those elements already discussed above with respect to FIGS. 1-3 are given prime notation and most require no further discussion herein. This embodiment differs from the previous embodiment in that the received frame 20' further includes three mini-probes 21a'-21c' and a pair of body portions 22a'-22b' therebetween.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
an antenna; and
a receiver coupled to said antenna and being configured to use a modulation having memory for a received message in a block structure, the block structure including a pair of mini-probes and a body therebetween, and to demodulate the received message by at least
determining a corresponding set of received signal characteristic values based upon the pair of mini-probes,
determining a decode starting point and a first time direction in the body based upon a phase value,
from the decode starting point, decoding the body in the first time direction, and
decoding the body in a second time direction based upon at least one result of the decoding in the first direction.

2. The mobile wireless communications device according to claim 1 wherein said receiver is configured to use the modulation with the block structure further comprising at least three mini-probes and a plurality of bodies therebetween.

3. The mobile wireless communications device according to claim 1 wherein said receiver is configured to determine survivor branch metrics from the decoding in the first time direction and to use the first direction survivor branch metrics in the decoding in the second direction.

4. The mobile wireless communications device according to claim 1 wherein said receiver is configured to determine the decode starting point by at least:
determining for each mini-probe the received signal characteristic value for a respective end portion of the body; and
selectively time reversing the mini-probes and body to provide the decode starting point at the end having a desired value for the received signal characteristic value.

5. The mobile wireless communications device according to claim 4 wherein the desired value comprises a minimum phase value.

6. The mobile wireless communications device according to claim 1 wherein said receiver is configured to determine the decode starting point and the first time direction in the body further based upon a set of received signal characteristic values comprising a received signal channel estimate value, and the phase value.

7. The mobile wireless communications device according to claim 1 wherein said receiver is configured to determine a channel estimate across the body based upon interpolating respective channel estimates from the mini-probes.

8. The mobile wireless communications device according to claim 1 wherein said receiver is configured to decode based upon a reduced trellis structure.

9. The mobile wireless communications device according to claim 8 wherein the at least one result comprises at least one survivor branch metric.

10. The mobile wireless communications device according to claim 1 wherein said receiver is configured to decode recursively.

11. The mobile wireless communications device according to claim 1 wherein said receiver is configured to decode using at least one of a BCJR algorithm, a Max-Log-MAP algorithm, a Constant-Log-MAP algorithm, a Linear-Log-MAP algorithm, and a Log-MAP algorithm.

12. The mobile wireless communications device according to claim 1 wherein the modulation is a continuous phase modulation (CPM).

13. A wireless receiver comprising:
a memory unit; and
a processor coupled to said memory unit and being configured to use a modulation having memory for a received message in a block structure, the block structure including a plurality of mini-probes and a plurality of bodies therebetween, and to demodulate the received message by at least
determining a corresponding set of received signal characteristic values based upon the plurality of mini-probes,
determining a decode starting point and a first time direction in the body based upon a phase value,
from the decode starting point, decoding each of the plurality of bodies in the first time direction and determining survivor branch metrics therefrom, and
decoding each of the plurality of bodies in a second time direction based upon at least the survivor branch metrics of the decoding in the first direction,
the decoding in the first and second time directions being based upon a reduced trellis structure.

14. The wireless receiver according to claim 13 wherein said processor is configured to determine the decode starting point by at least:
determining for each mini-probe the received signal characteristic value for a respective end portion of an adjacent body; and
selectively time reversing the adjacent body to provide the decode starting point at the end having a desired value for the received signal characteristic value.

15. The wireless receiver according to claim 14 wherein the desired value comprises a minimum phase value.

16. The wireless receiver according to claim 13 wherein said processor is configured to determine the decode starting point and the first time direction in the body further based upon a set of received signal characteristic values comprising a received signal channel estimate value, and the phase value.

17. The wireless receiver according to claim 13 wherein said processor is configured to determine a channel estimate across the body based upon interpolating respective channel estimates from the mini-probes.

18. The wireless receiver according to claim 13 wherein the at least one result comprises at least one survivor branch metric.

19. A method of receiving a message in a block structure and with a modulation having memory, the block structure including a pair of mini-probes and a body therebetween, the method comprising:
using a processor to determine a corresponding set of received signal characteristic values based upon the pair of mini-probes;
using the processor to determine a decode starting point and a first time direction in the body based upon a phase value;
from the decode starting point, using the processor to decode the body in the first time direction; and
using the processor to decode the body in a second time direction based upon at least one result of the decoding in the first direction.

20. The method according to claim 19 further comprising using the block structure further comprising at least three mini-probes and a plurality of bodies therebetween.

21. The method according to claim 19 further comprising using the processor to determine survivor branch metrics from the decoding in the first time direction and to use the first direction survivor branch metrics in the decoding in the second direction.

22. The method according to claim 19 wherein using the processor to determine the decode starting point comprises:
using the processor to determine for each mini-probe the received signal characteristic value for a respective end portion of the body; and
using the processor to selectively time reverse the body to provide the decode starting point at the end having a desired value for the received signal characteristic value.

23. The method according to claim 22 wherein the desired value comprises a minimum phase value.

24. The method according to claim 19 wherein using the processor to determine the decode starting point and the first time direction in the body is further based upon a set of received signal characteristic values comprising a received signal channel estimate value, and the phase value.

25. The method according to claim 19 further comprising using the processor to determine a channel estimate across the body based upon interpolating respective channel estimates from the mini-probes.

26. The method according to claim 19 further comprising using the processor to decode based upon a reduced trellis structure.

27. The method according to claim 19 further comprising using the processor to decode recursively.

28. The method according to claim 19 further comprising using the processor to decode using at least one of a BCJR algorithm, a Max-Log-MAP algorithm, a Constant-Log-MAP algorithm, a Linear-Log-MAP algorithm, and a Log-MAP algorithm.

29. The method according to claim 19 further comprising using a continuous phase modulation (CPM) for the modulation.

30. A mobile wireless communications device comprising:
an antenna; and
a receiver coupled to said antenna and being configured to use a modulation having memory for a received message in a block structure, the block structure including a pair of mini-probes and a body therebetween, and to demodulate the received message by at least
determining a corresponding set of received signal characteristic values based upon the pair of mini-probes,
determining a decode starting point in the body based upon the set of received signal characteristic values by at least
determining for each mini-probe the received signal characteristic value for a respective end portion of the body, and
selectively time reversing the mini-probes and body to provide the decode starting point at the end having a minimum phase value for the received signal characteristic value,
from the decode starting point, decoding the body in a first time direction, and
decoding the body in a second time direction based upon at least one result of the decoding in the first direction.

31. A method of receiving a message in a block structure and with a modulation having memory, the block structure including a pair of mini-probes and a body therebetween, the method comprising:
using a processor to determine a corresponding set of received signal characteristic values based upon the pair of mini-probes;
using the processor to determine a decode starting point in the body based upon the set of received signal characteristic values by at least
using the processor to determine for each mini-probe the received signal characteristic value for a respective end portion of the body, and
using the processor to selectively time reverse the body to provide the decode starting point at the end having a minimum phase value for the received signal characteristic value;
from the decode starting point, using the processor to decode the body in a first time direction; and
using the processor to decode the body in a second time direction based upon at least one result of the decoding in the first direction.

* * * * *